March 25, 1969  E. R. BRASTOW ET AL  3,434,355
GYROSCOPE
Filed May 12, 1966
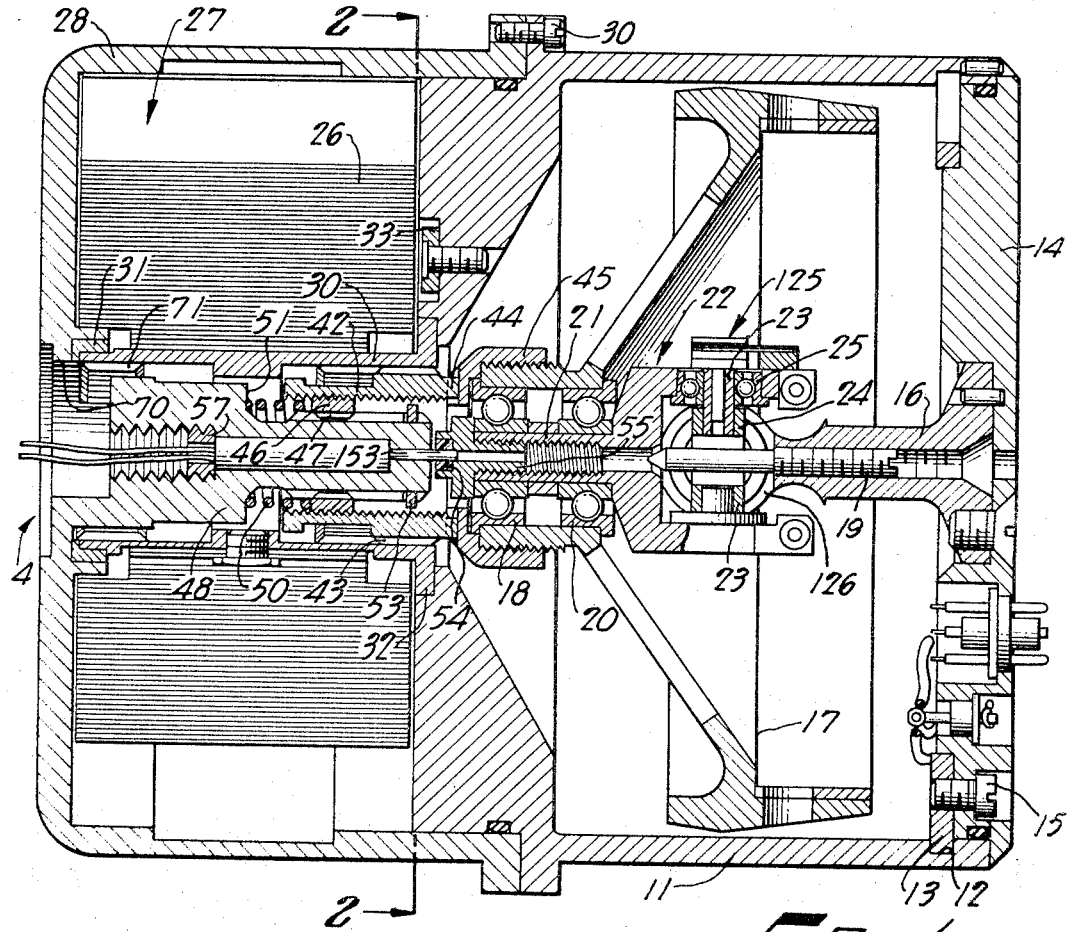
FIG_1
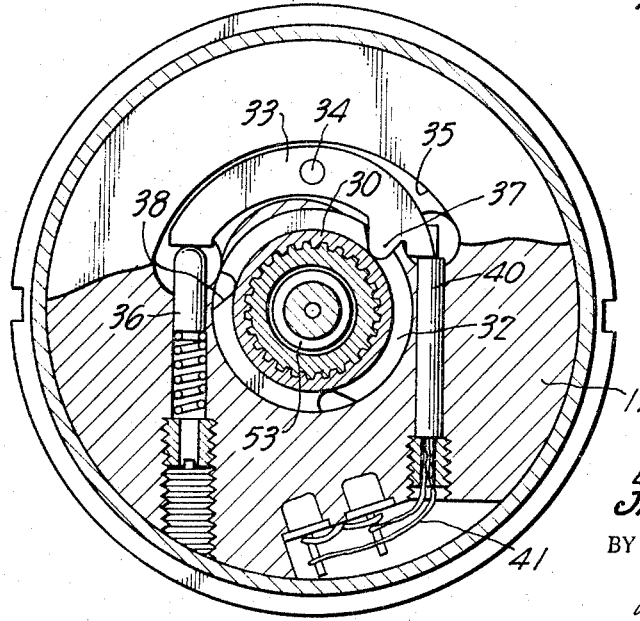
FIG_2
EDGAR R. BRASTOW
JAMES BJORDAHL
RONALD F. LITTLE
BY
ATTORNEY.

March 25, 1969  E. R. BRASTOW ET AL  3,434,355
GYROSCOPE
Filed May 12, 1966  Sheet 2 of 2
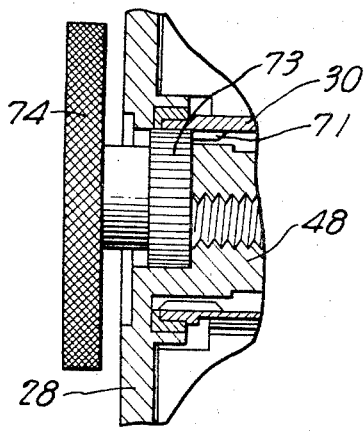
FIG_3_
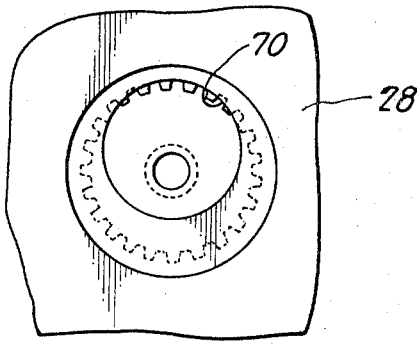
FIG_4_
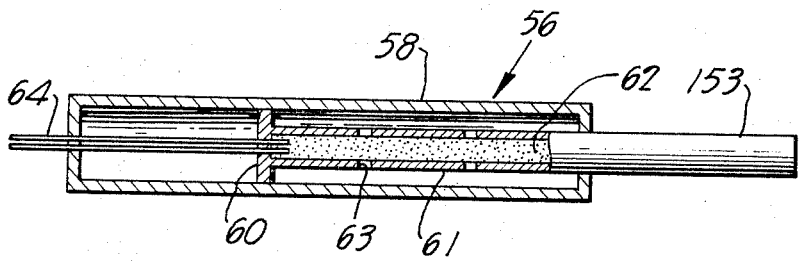
FIG_5_
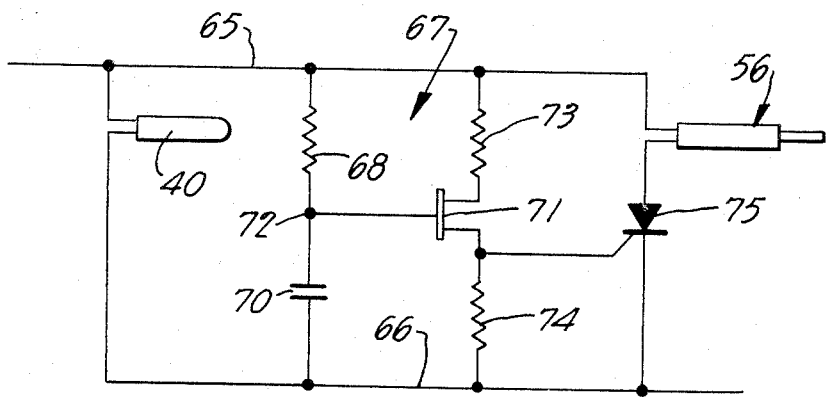
FIG_6_
EDGAR R. BRASTOW
JAMES BJORDAHL
RONALD F. LITTLE
BY
ATTORNEY.

United States Patent Office 3,434,355
Patented Mar. 25, 1969

3,434,355
GYROSCOPE
Edgar R. Brastow, Woodland Hills, James Bjordahl, Arcadia, and Ronald F. Little, San Dimas, Calif., assignors to Clary Corporation, San Gabriel, Calif., a corporation of California
Filed May 12, 1966, Ser. No. 549,719
Int. Cl. G01c 19/22
U.S. Cl. 74—5.12                    4 Claims

ABSTRACT OF THE DISCLOSURE

A spring driven gyroscope with a gimballed rotor and with a caging pin slideable in a part of the gyroscope housing and engageable with the gimbal means axially of the rotor, combined with a coupling device for coupling the spring drive means with the rotor, a latch for normally latching the spring drive device from driving the rotor, and means for releasing the latch and subsequently withdrawing the caging pin from engagement with the gimbal means.

---

This invention relates to spring driven gyroscopes for use in controlling guided missiles or other craft in which the duration, in time, of flight is relatively short.

It is highly desirable to have a missile of the above type always ready for immediate use so that it may be fired as soon as a target is sighted or located. On the other hand, the rotors of gyroscopes used to control such missiles must be operated at a relatively high rotational speed in order to effect a controlling function. Therefore, the usual electric motors, gas turbines, or other motive devices normally used to drive the rotor are unsatisfactory due to the undue length of time required to bring the rotor up to speed. Although the gyroscope rotor could be continuously rotated in a standby condition so as to be in readiness at all times, this would entail expensive bearings and other parts, as well as maintenance and replacement, from time to time, due to such continuous operation.

Accordingly, spring driven gyroscopes have been developed in which a relatively strong clock spring or the like is used to rapidly bring the rotor up to operating speed just prior to launching the missile. Since the run-up time of a spring driven rotor is restricted to a small fraction of a second, in some cases on the order of 10 milliseconds, the drive spring must be strong enough to quickly unleash a large amount of energy, resulting in relatively high impact and vibration forces being transmitted to various parts of the gyroscope, such as the rotor, gimbal system, etc. During such run-up of the rotor, the gimbal system is caged to properly orient the rotor spin axis until the rotor reaches controlling speed and this caging must ideally be maintained until the jarring and vibration forces die out, otherwise an "uncaging kick" may occur during the uncaging operation which would tend to throw the rotor into an oscillating or nutation movement which would detrimentally affect its controlling action.

Also, in most spring driven gyroscopes, the spring drive mechanism is disengaged from the rotor shortly before the full energy of the spring is transferred to the rotor, and separation of the coupling parts, due to minor inaccuracies in construction or flexing of such parts, further tends to impart an uncaging kick, tending to introduce nutation of the rotor and requiring full caging of the gimbals until such upsetting force, as well as the jarring due to the sudden unleashing of the remaining energy in the spring, die out.

It has also been found that an uncaging kick can result during withdrawal of the caging device from engagement with the gimbal means, particularly if there is any residue vibration left at that time and if there is even a minute freedom of movement of the gimbal means during the uncaging operation. It has been found that this can be held to a minimum by providing an axially movable caging pin which is slideably supported in snugly fitting bearings located directly adjacent the gimbal means and formed integrally with the gyroscope housing or base, and by quickly removing the caging pin from engagement with the gimbal means after the above noted vibrations have died out. However, such design has heretofore resulted in complications of construction of the remaining parts of the gyroscope. For example, heretofore, rewinding of the spring for the purpose of testing the gyroscope generally required at least partial dismantling of the gyroscope case or housing so as to permit rotation of the rotor in order to wind the spring. This not only requires additional time and effort but may also permit entrance of contaminating dirt or dust into the gyroscope bearings and other parts of the gyroscope when the housing is removed.

Accordingly, a principal object of the present invention is to provide a spring driven gyroscope of the above type which overcomes the above noted defects of present spring wound gyroscopes.

Another object is to provide a spring wound gyroscope of the above type which is highly accurate and yet may be manufactured and assembled at a relatively low cost.

Another object is to provide a spring driven gyroscope of the above type which may be placed in operative controlling condition in a minimum length of time.

Another object is to facilitate rewinding of the spring of a gyroscope of the above type without removing any part of the gyroscope housing or case.

The manner in which the above and other objects of the invention are accomplished will be readily understood on reference to the following specification when read in conjunction with the accompanying drawings, wherein:

FIG. 1 is a longitudinal sectional view through a gyroscope embodying a preferred form of the present invention and illustrating the drive mechanism therefor in energized condition.

FIG. 2 is a transverse sectional view taken substantially along the line 2—2 of FIG. 1.

FIG. 3 is a fragmentary sectional view through the gyroscope illustrating the spring winding tool in place.

FIG. 4 is a fragmentary end view taken in the direction of the arrow 4 of FIG. 1.

FIG. 5 is an enlarged view, partly in section, of the caging pin and its explosive squib.

FIG. 6 is a schematic view illustrating the electric circuit for detonating the explosive squibs.

Referring in detail to the drawings, a cup-shaped base or housing 11 is provided having an annular groove 12 which receives a snap ring member 13. A bulkhead 14 is removably attached to the member 13 by screws 15 to form part of the gyroscope base and has attached thereto a gimbal supporting pedestal 16.

A rotor 17 is located in the rotor compartment formed by the members 11 and 14 and is rotatably supported by means of ball bearings 18 and 20 on the shaft portion 21 of a first gimbal member 22. The latter is bifurcated to form a pair of spaced arms which are pivotally supported by ball bearings, i.e., 25, on coaxially extending shaft sections 23 of a center block 24 comprising a second gimbal member. The center block 24 is pivotally supported by suitable ball bearings, not shown, carried by spaced arms, i.e., 126, on the pedestal 16 for movement about an axis extending at right angles to and intersecting the axis of the shaft sections 23, thus permitting universal movement of the gyroscope base about the point of intersection of such axes, such point of intersection also intersecting the spin axis of the rotor 17.

Suitable attitude pickoff devices, one of which is generally indicated at 125, are provided to indicate the attitude of the gyroscope base relative to the spin axis of the rotor. These may be of any well known construction.

The amount of angular movement of the gyroscope base relative to the spin axis of the rotor 17 is limited by an adjustable limit screw 19 screw threaded in the pedestal 16 and engageable with the caging member 22 when the latter moves beyond a predetermined amount in any direction.

The rotor 17 is brought up to operating speed by a spiral or clock spring 26 located within a spring compartment 27 formed by a cup-shaped spring housing 28 which is attached to the housing 11 by screws 30. The housing 28 and parts 11 and 14 together form the gyroscope housing.

The spring 26 is suitably secured at its outer end in a manner, not shown, to the interior of the housing 28 and at its inner end to a tubular arbor 30 which is rotatably supported at its lefthand end in a bearing bushing 31 supported by housing 28 and at its righthand end in a bearing formed in the housing 11.

The arbor 30 is adapted to be latched in condition holding the spring 26 in its illustrated energized condition and for this purpose a pawl 33 (see also FIG. 2) is fulcrummed at 34 in a cutout section 35 of the housing 11. The pawl is urged clockwise by a spring pressed plunger 36 to normally maintain a locking nose 37 in locking engagement with one of three notches 38 formed in the arbor 30.

The pawl 33 is rocked counterclockwise to release the arbor 30 by an explosive squib 40 which is mounted in the housing 11. The squib contains a powder charge which is electrically fired through wire conductors 41 and when so fired the squib will quickly expand lengthwise to rock the pawl 33 sufficiently to release the arbor 30 for rotation by the spring 26.

The arbor 30 slideably supports a tubular drive member 42 to which it is splined at 43, thus permitting longitudinal movement of the drive member but preventing relative rotation between the latter and the arbor 30. The drive member has a pair of diametrically opposed tongues 44 forming coupling parts which normally engage in mating grooves forming coupling parts in a cap member 45 threadably attached to the rotor 17 for the purpose of maintaining the latter in place on the bearings 18 and 20.

The drive member 42 is screw threaded on a nut 46 which is splined at 47 on a tubular extension 48 integral with the spring housing 28 and extending inwardly therefrom.

A compression spring 50 surrounds the extension 48 and extends between a shoulder 51 on the extension and the nut member 46, thereby normally maintaining the drive member 42 in coupled relation to the rotor.

When it is desired to bring the rotor up to operating speed, the squib 40 is fired to cause the pawl 33 to release the arbor 30 for rotation by spring 26. Such rotation is transmitted through the drive member 42 to the rotor and during such rotation the nut 46 is caused to travel to the right along the extension 48 until it limits against a spring clip 53 attached to the extension. Accordingly, as the arbor 30 continues to rotate, the nut 46 will draw the driving member 42 to the left to withdraw the tongues 44 from coupling engagement with the cap member 45, thereby leaving the rotor 17 to rotate freely. During this time, the gyroscope is held in a caged condition by a caging pin 153 slideably mounted in the extension 48. The caging pin fits snugly within a mating hole in a plastic bushing 54 in a retainer member 55 threadably secured to the gimbal member 22 for the purpose of holding the bearings 18 and 20 on the shaft section 21.

As shown in FIG. 5, the caging pin 153 forms part of a second powder squib 56 which is secured within the extension 48 by a nut 57 and comprises a casing 58 in which is slideable a head 60 integral with a tubular extension 61 of the caging pin 153. The tubular extension 61 is filled with an explosive powder charge 62 and when detonated by an electrical current passed through conductors 64 generates an expansive gas which passes through openings 63 in the extension 61 to withdraw the caging pin to the left out of caging engagement with the member 22.

As noted heretofore, the caging pin 153 is withdrawn only after the rotor 17 has been released for free rotation and after at least most of the vibration resulting from release of the drive spring etc. has died down.

For this purpose, an electric circuit shown in FIG. 6 is provided for firing the two powder squibs 40 and 56 in timed sequence. For this purpose, a pair of direct current power supply lines 65 and 66 are directly connected to the operating terminals of the squib 40 and are connected to the corresponding terminals of the squib 56 through a delay circuit generally indicated at 67. The latter comprises a resistor 68 and capacitor 70 connected in series across the power supply lines. A "unijunction" type transistor 71 has its emitter connected to a juncture point 72 between the resistor 68 and capacitor 70 and has its bases connected through resistors 73 and 74 to respective ones of the powerlines. One of such bases is connected to the control electrode of a silicone controlled rectifier 75 which is connected in series with the terminals of squib 56 across the power supply lines 65 and 66. When the power supply lines 65 and 66 are energized, the squib 40 is fired and at a timed interval thereafter, depending upon the time constant of the RC combination 68 and 70, a signal will be applied to the transistor 71 to cause the rectifier 75 to conduct, thereby firing the squib 56.

For the purpose of winding the spring 26, a cylindrical recess 170 is formed in the end wall of the spring housing 28, the axis of such opening being eccentric to the axis of the extension 48 so as to expose a portion of a set of internal gear teeth 171 formed on the arbor 30 adjacent its lefthand end.

In order to wind the spring, the gear 173 of a spring winding tool 174 (FIG. 3) is inserted in the recess 170. The gear rotatably journals in the recess and meshes with the teeth 171 whereby rotation of the tool will rotate the arbor 30 and thus wind the spring.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. A gyroscope comprising a rotor having a first coupling part,
   gimbal means supporting said rotor for movement about a spin axis and for movement about mutually perpendicular axes intersecting said spin axis,
   a gyroscope housing supporting said gimbal means,
   a tubular extension integral with said housing,
   the axis of said extension intersecting said first mentioned intersection,
   a caging pin slideable lengthwise in said extension and normally extending in caging engagement with said gimbal means,
   a tubular arbor supported by said housing for rotation concentrically of said extension,
   a spring extending between said housing and said arbor for rotating said arbor,
   a tubular drive member slideable axially within said arbor,
   means for preventing relative rotation between said arbor and said drive member,
   a second coupling part on said drive member engageable with said first coupling part whereby to drive said rotor,
   a nut movable axially over said extension,
   means preventing relative rotation between said nut and said extension, said nut having a screw threaded connection with the interior of said drive member, means for limiting axial movement of said nut member whereby to cause said drive member to retract said second coupling part from driving engagement with said first coupling part, means for latching said rotor against rotation, and means for releasing said latching means and for retracting said caging pin seriatim.

2. A gyroscope according to claim 1 wherein said housing has a cylindrical recess therein eccentric to the axis of said caging pin and communicating with the interior of said housing, internal gear teeth on said arbor extending into said recess, and a winding tool having external gear teeth meshing with said internal gear teeth upon insertion of said tool into said opening, said tool being rotatable whereby to cause said arbor to energize said spring.

3. A gyroscope according to claim 1 wherein said last mentioned means comprises first means forming a first pyrotechnical charge effective upon detonation to release said latching means, means forming a second pyrotechnical charge effective upon detonation to retract said caging pin, and means including a time delay device responsive to operation of said first means for detonating said second charge.

4. A gyroscope comprising a rotor, gimbal means supporting said rotor for rotation about a spin axis and for movement about mutually perpendicular axes, yieldable means for rotating said rotor, latch means for latching said rotor against rotation, caging means for said gimbal means, means forming a first pyrotechnical charge effective upon detonation to release said latch means, means forming a second pyrotechnical charge effective upon detonation to uncage said caging means from said gimbal means, first electrical means for detonating said first charge, second electrical means for detonating said second charge, and a time delay circuit responsive to energization of said first electrical means for energizing said second electrical means.

References Cited

UNITED STATES PATENTS

| | | | |
|---|---|---|---|
| 3,111,038 | 11/1963 | Lewis et al. | 74—5.1 |
| 3,232,121 | 2/1966 | Todter | 74—5.1 |
| 3,263,508 | 8/1966 | Voge et al. | 74—5.12 |
| 3,270,568 | 9/1966 | Moravek et al. | 74—5.12 |

C. J. HUSAR, *Primary Examiner.*

U.S. Cl. X.R.

74—5.7